April 25, 1961   G. TARBUTTON ET AL   2,981,598
MANUFACTURE OF CRYOLITE FROM WASTE GASES
Filed Oct. 13, 1958
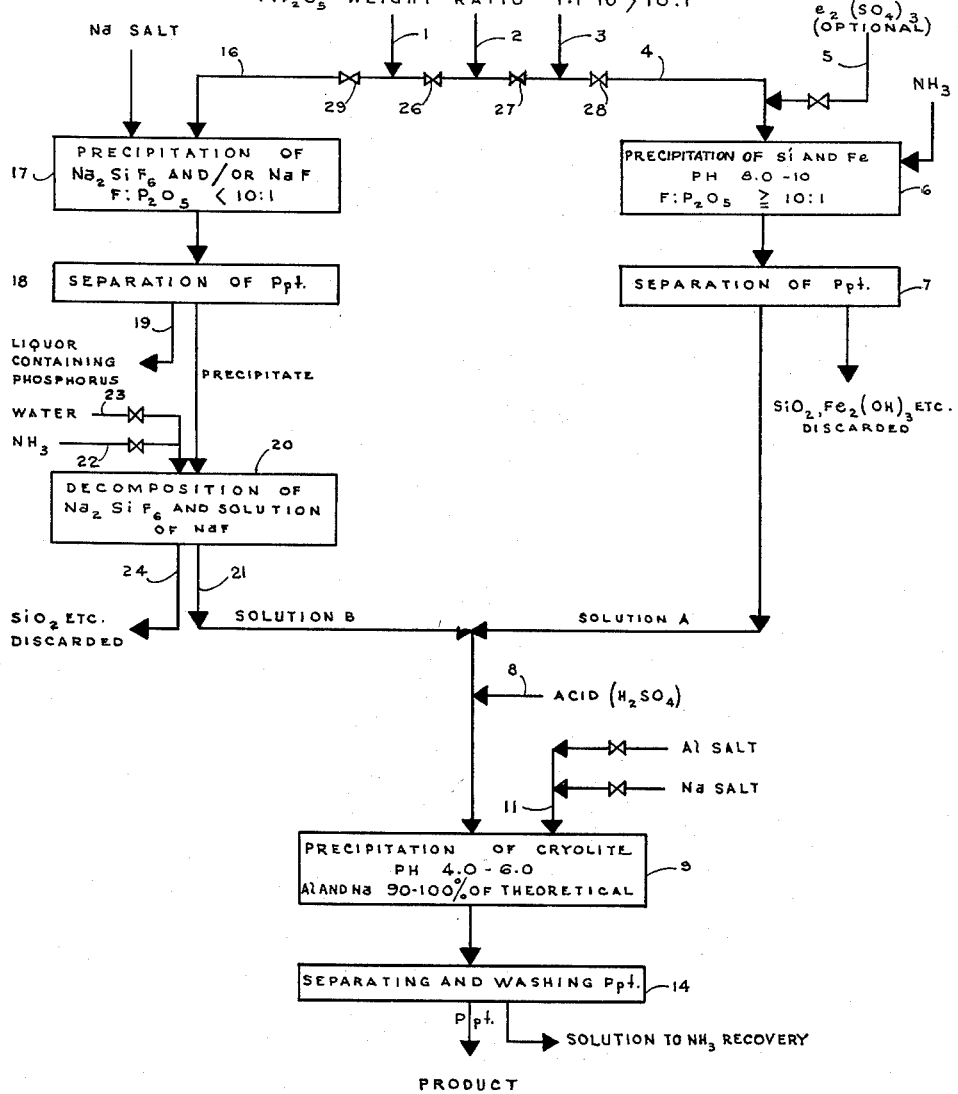
Grady Tarbutton
Thad D. Farr
Thomas M. Jones        INVENTORS.
Harry T. Lewis, Jr.
BY Bentley O. Morrow
    Attorney United States Patent Office 2,981,598
Patented Apr. 25, 1961

2,981,598

MANUFACTURE OF CRYOLITE FROM WASTE GASES

Grady Tarbutton, Thad D. Farr, and Thomas M. Jones, Sheffield, and Harry T. Lewis, Jr., Florence, Ala., assignors to Tennessee Valley Authority, a corporation of the United States Filed Oct. 13, 1958, Ser. No. 767,072

3 Claims. (Cl. 23—88)

(Granted under Title 35, U.S. Code (1952), sec. 266)

The invention herein described may be manufactured and used by or for the Government for governmental purposes without the payment to us of any royalty therefor.

This invention is an improved process for the manufacture of cryolite ($Na_3AlF_6$) of high purity from scrub liquors resulting from scrubbing waste gases evolved from processes in the phosphate industry and containing fluorine and congeneric impurities. The manufacture of phosphatic fertilizers, phosphoric acid, elemental phosphorus, and the like, results in evolution of such waste gases.

Fluorine is evolved in the processing of phosphate rock and related processes as hydrogen fluoride, silicon tetrafluoride, or a mixture of the two gases. It is estimated that about 100,000 tons of fluorine were evolved in processing about 11,000,000 tons of phosphate rock in the United States in 1955. The effluent gases usually are dilute with relation to fluorine compounds, usually contain compounds of silicon, and they may contain phosphorus compounds, carbon dioxide, oxides of sulfur, water vapor, and entrained solid and liquid particles. The development of processes for the recovery of useful fluorine compounds from such gases has been handicapped by the low concentration of fluorine and the associated contaminants.

It is known that fluorine compounds can be removed readily from the gases evolved in processing phosphate rock by scrubbing the gases with slightly acidic aqueous ammonium fluoride. Scrub liquor is recycled, and its acidity is controlled by adding ammonia. Hydrogen fluoride dissolves and reacts with ammonia in the aqueous solution to form ammonium fluoride. Silicon tetrafluoride dissolves in aqueous ammonium fluoride to form a solution of ammonium fluosilicate. In contrast, when silicon tetrafluoride is scrubbed with water, about one-third of the silica precipitates in a gelatinous form and two-thirds dissolves to form fluosilicic acid. By keeping the scrubbing solution slightly acidic (pH 5 to 6), carbon dioxide is not absorbed, the absorption of sulfur dioxide is limited, and the solution is not highly corrosive. Moreover, the partial pressure of ammonia over such solutions is low and little ammonia is lost in the scrubbing operation.

In the production of elemental phosphorus by the electric-furnace process, phosphorus vapor is condensed by cooling with recycled aqueous spray liquor. To minimize corrosion in the condenser system, where acid is formed, an alkaline agent is added to the liquor. When ammonia is used for this purpose, fluorine evolved from the electric furnace is absorbed to form ammonium fluosilicate and ammonium fluoride. The condenser liquor also contains phosphorus compounds and solids.

The weight ratio $F:P_2O_5$ in liquors obtained by scrubbing effluent gases from phosphate-rock processing plants and the like with slightly acidic ammonium fluoride solutions varies widely. For example, recycled liquor (pH maintained in the range from 5.0 to 6.0 by adding ammonia) used for condensing phosphorus from electric-furnace gas was found to contain fluorine and phosphorus pentoxide in weight ratios $F:P_2O_5$ ranging from 1.4 to 1.8. The liquor formed by scrubbing nodulizing kiln effluent gas had weight ratios $F:P_2O_5$ ranging from 10 to 30, and the liquor formed by scrubbing the effluent gas from a calcium metaphosphate fertilizer furnace had weight ratios $F:P_2O_5$ in the range from 6 to 8. When gases evolved in the manufacture of superphosphate are scrubbed with a slightly acidic solution of ammonium fluoride, the weight ratio $F:P_2O_5$ in the liquor may be 100 or higher.

One large producer of aluminum sets the following specifications for synthetic cryolite:

Fluorine content at least 85 percent of that represented by the formula $Na_3AlF_6$ Maximum limits of impurities:

| | Percent |
|---|---|
| $P_2O_5$ | 0.1 |
| $SiO_2$ | 0.6 |
| $Fe_2O_3$ | 0.25 |
| $SO_3$ | 5 |

The term "specification-grade cryolite" is used in this specification and subtended claims to mean cryolite conforming to the above specifications.

It is an object of our invention to provide a process for the production of cryolite, $Na_3AlF_6$, of purity at least as high as that required to meet the specifications given above from byproduct fluorine scrub liquors contaminated with phosphorus.

Another object is to provide such process which is applicable to scrub liquors having a wide range of $F:P_2O_5$ ratios.

Another object is to provide such process in which a high percentage of fluorine is recovered.

Still another object is to provide a process of the above type which is cheap and simple in operation and does not require high equipment costs.

Other objects and advantages will be apparent from the description given below.

We have found that these objects are attained in a process which comprises adding a mineral acid such as $H_2SO_4$ to a solution having low silica and iron contents and wherein the weight ratio of $F:P_2O_5$ is 5:1 or more to lower the pH sufficiently that the addition of soluble sodium and aluminum salts (from 95 to 100 percent of the stoichiometric quantities required to form $Na_3AlF_6$ with all the fluorine) will give a final pH in the range 4 to 6. The degree of acidulation and the quantities of sodium and aluminum used within these ranges depend upon the weight ratio $F:P_2O_5$ in the ammoniated liquor. The precipitate is separated, washed, and dried.

We have found that a cryolite product precipitated in the proper acid range by the addition of from 95 to 100 percent of the theoretical requirements of aluminum and sodium consistently contains at least 85 percent of the fluorine represented by the formula $Na_3AlF_6$ and does not contain more phosphorus than the equivalent of 0.1 percent $P_2O_5$, not more silicon than the equivalent of 0.6 percent $SiO_2$, not more iron than the equivalent of 0.25 percent $Fe_2O_3$, and not more sulfur than the equivalent of 5.0 percent $SO_3$.

The attached drawing is a flow sheet illustrating a generic process utilizing principles of our invention and five species of preparations of solutions suitable for the precipitation of high-grade cryolite.

In the drawing the reference numerals 1, 2, and 3 designate one or more scrub liquors resulting from scrubbing waste gases containing fluorine, phosphorus, and congeneric impurities emitted from processes in the phosphate industry with aqueous ammonium fluoride liquor maintained at pH 5 to 6 by addition of ammonia.

When the weight ratio of $F:P_2O_5$ in scrub liquor is at least 5:1, and preferably at least 10:1, the scrub liquor is led through line 4 to a precipitation step 6. In this step, ammonia is added to the scrub liquor at room temperature in quantity sufficient to bring the pH into the range from 8.0 to 10.0, preferably about 8.5 to 9.0. Addition of ammonia in such quantity results in the precipitation of almost all silica and iron in the solution. We have found that a precipitate of excellent filterability results when this step is carried out at room temperature. The silica and iron precipitates produced occlude and carry down with them certain other substances which may be present in the scrub liquor. Up to 15 percent or so of the phosphorus present may be carried down in the silica-iron precipitate. Very little fluorine, however, is precipitated.

While the proportions of materials in the precipitate vary somewhat with the composition of scrub liquor treated, in one case in which we kept a material balance on this step it was found that 96 percent of the silica, 72 percent of the ferric oxide, 13 percent of the phosphorus pentoxide, and less than 1 percent of the fluorine were precipitated. The precipitate and accompanying solution are passed to a precipitate-separation step 7; and the precipitate of silica, iron, and other materials is discarded. The solution, designated as solution A in the drawing, is then acidified, preferably with sulfuric acid introduced through line 8, to a pH from about 4 to 6. The degree of acidulation depends upon the $F:P_2O_5$ weight ratio. When this ratio is below 15:1, sufficient acid is added to yield a final pH of about 4 to 5, after addition of sodium and aluminum salts; when the ratio is 40 or more, the final pH should be about 5.8 to 6.

In cryolite-precipitation step 9, solution A is mixed with solutions of sodium and aluminum salts, preferably the sulfates, introduced via line 11. Both the pH and the proportions of sodium and aluminum added to precipitate cryolite, illustrated by the equation

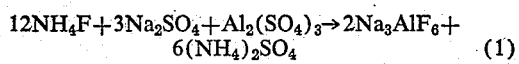

$$12NH_4F + 3Na_2SO_4 + Al_2(SO_4)_3 \rightarrow 2Na_3AlF_6 + 6(NH_4)_2SO_4 \quad (1)$$

affect the purity ($P_2O_5$ content) of the cryolite. When the weight ratio $F:P_2O_5$ is of the order of 5 and the pH of the mixture is about 4.0, 95 percent of the sodium and aluminum salts stoichiometrically required to form $Na_3AlF_6$ with all the fluorine present in the solution may be used. Our results indicate that if the pH is lower than 4.5, say 3.0, larger proportions of sodium and aluminum salts can be used. The process is applicable to systems in which the pH is lower than 3.0, but separation of the precipitated cryolite is more difficult, the solution dissolves some of the cryolite otherwise recoverable, and more reagents are required. We prefer operating with solutions in which the pH is at least 4.0, and preferably 4.5 or higher.

As the weight ratio of $F:P_2O_5$ in the solution is increased, either the proportions of sodium and aluminum (either simultaneously or separately) or the pH, or both, may be increased to recover cryolite meeting the specifications previously given. Our results indicate that a greater proportion of the fluorine is recovered as cryolite from a given solution with an increase of the pH or by an increase of the proportions of sodium and aluminum salts.

When the weight ratio $F:P_2O_5$ in the solution is of the order of 40:1 or higher and the pH is about 5.8, even an excess of the precipitating reagents might be used. When the weight ratio $F:P_2O_5$ is of the order of 40:1, the upper practical limits of pH appear to be about 6.0, and proportions of sodium and aluminum added appear to be about 100 percent of the stoichiometric amounts.

Cryolite precipitates in this step in a highly pure form. The liquor and precipitate are then passed to a precipitation separation and washing step 14. Solution is withdrawn from this step and passed to an ammonia-recovery system.

We have found that cryolite precipitated under the conditions given in step 9, after washing, consistently has a fluorine content in excess of 85 percent of that represented by the formula $Na_3AlF_6$ and has a $P_2O_5$ content below 0.1 percent, an $SiO_2$ content of less than 0.6 percent, an $Fe_2O_3$ content of less than 0.25 percent, and an $SO_3$ content below 5.0 percent.

Although we have found, as stated above, that specification-grade cryolite can be made from solutions in which the weight ratio $F:P_2O_5$ is 5 or possibly lower, we prefer to operate with solutions in which the weight ratio $F:P_2O_5$ is higher, say at least 10, because conditions affecting the recovery of fluorine as cryolite and contamination of the cryolite with $P_2O_5$ become less critical.

One way to increase the weight ratio of $F:P_2O_5$ in scrub liquors is to preferentially precipitate a part of the phosphate as $FePO_4$. We have found that 85 percent of the phosphate is removed when twice the stoichiometric quantity of ferric sulfate required to form $FePO_4$ with the phosphate is added to slightly acidic scrub liquor containing about 30 grams of fluorine and about 3 grams of $P_2O_5$ per liter, thereby increasing the $F:P_2O_5$ ratio from 10 to about 60. The ferric sulfate may be introduced via line 5 and the process continued by the steps 6, 7, 8, 9, and 14 just described.

The excess iron added is precipitated along with silica in step 6 and is discarded. No exact lower limit can be set on the use of ferric sulfate in this step. The lower limit of the weight ratio of $F:P_2O_5$ which can be raised to 10:1 is set by economics and not by chemistry. It will be found uneconomical to use sufficient ferric sulfate when the weight ratio of $F:P_2O_5$ is far below 10:1.

When a scrub liquor obtained by scrubbing waste gases containing compounds of fluorine, phosphorus, iron, sulfur, and other congeneric impurities evolved in a process in the phosphorus industry contains fluorine and phosphorus in such proportions that the weight ratio of $F:P_2O_5$ is less than 10:1, or in the range from about 1:1 to 10:1, we prefer to divide the liquor into two parts.

The first part is passed via line 4 to silica and iron precipitation step 6. It is there treated as described above by adding ammonia to a pH in the range from about 8 to 10, preferably about pH 8.5 to 9. The resulting precipitate, containing silica, iron, and occluded impurities, is separated in separation step 7. The solution resulting from this separation, designated as solution A in the drawing, may have an $F:P_2O_5$ weight ratio of less than 10:1.

The other part of the scrub liquor, after removing any solids present, is passed via line 16 to step 17 in which sodium silicofluoride and/or sodium fluoride are precipitated by addition of a soluble sodium salt. The precipitate is separated in step 18, and the liquor containing a large proportion of phosphorus originally present, and other impurities, is withdrawn via line 19. This liquor may contain sufficient phosphorus and ammonia to make their recovery worth while. The precipitate is passed to step 20 and there is treated with an aqueous solution of ammonia in quantity sufficient to decompose all sodium silicofluoride present with formation of silica and ammonium fluoride, and to dissolve all sodium fluoride present or formed in this decomposition step. A precipitate consisting principally of silica is withdrawn via line 24. The resulting solution, designated as solution B in the drawing, is then combined with solution A.

The combined solution will have an F:P₂O₅ weight ratio of more than 10:1. It is acidified, and cryolite is precipitated by adding sodium and aluminum salts as described above.

When the scrub liquor has a low weight ratio of F:P₂O₅, that is, below 5:1, we prefer to pass the entire quantity of liquor via line 16 to step 17, where sodium silicofluoride and/or sodium fluoride is precipitated by addition of sodium salts. The precipitate is separated in step 18 and liquor removed via line 19. The precipitate is passed to step 20 and there is treated with an aqueous solution of ammonia in quantity sufficient to decompose all sodium silicofluoride present with formation of silica and ammonium fluoride, and to dissolve all sodium fluoride present or formed in this decomposition step. A precipitate consisting principally of silica is withdrawn via line 24. The resulting solution is designated as solution B in the drawing. Specification-grade cryolite is then precipitated from solution B by step 9, as described above.

When more than one scrub liquor is to be treated and these have widely varying F:P₂O₅ weight ratios, we prefer to combine the steps described above to form a suitable solution for precipitation of cryolite. If one of these liquors has an F:P₂O₅ weight ratio of more than 10:1, it is passed via line 4 to steps 6 and 7 to form a suitable solution for acidification and cryolite precipitation in step 9.

If another of the liquors has an F:P₂O₅ weight ratio well below 10:1 in the range where it would be desirable to split the stream, such liquor is admitted through line 2 and is divided into two parts by suitable regulation of valves 26, 27, 28, and 29 to divided the stream, sending a part via line 4 to step 6 and the other part via line 16 to step 17. If a third liquor has a low F:P₂O₅ weight ratio and is particularly high in silica, it is added to the stream flowing through line 16 to step 17.

Any combination of scrub liquors may be used in our process by varying the proportions of liquors which are fed through lines 4 and 16 to form a combined solution having a weight ratio F:P₂O₅ above 5:1, and preferably about 10:1, at the time acid is introduced via line 8 to permit precipitation of pure cryolite in step 9.

The following examples illustrate specific applications of our process.

EXAMPLE I

A scrub liquor (F, 30.7; S, 17.0; SiO₂, 10.5; P₂O₅, 1:15; Fe₂O₃, 0.7; Al₂O₃, 0.3; CaO, 0.1; and K₂O, 0.2 gram per liter) was obtained by scrubbing a phosphate nodulizing kiln gas in a plant-scale unit with an aqueous solution of ammonium fluoride maintained at pH 5.0 to 6.0 by addition of ammonia. A portion of the scrubber liquor was adjusted to pH 9 with aqueous ammonia at room temperature and filtered. The filtrate was concentrated in glassware to yield stock solution I (weight ratio F:P₂O₅, 40; composition, grams per liter: F, 52.0; P₂O₅, 1.3; SiO₂, 1.2).

Solutions whose F:P₂O₅ weight ratios ranged from 5 to 40 were prepared from stock solution I with or without additions of ammonium phosphate solution. The amount of phosphate precipitated with the cryolite from the solutions was determined as functions of the proportions of aluminum and sodium added, and the pH of the precipitation mixture. The terminal pH of the precipitation mixtures, which ranged from 4.0 to 6.2, was controlled by adding sulfuric acid to solution I before adding sodium and aluminum sulfates.

The tabulated results show the conditions for preparing specification grade sodium cryolite from kiln gas scrubber liquor by the acid method. The cryolite contained fluorine equivalent to 94 to 98 percent Na₃AlF₆, and 80 to 92 percent of the fluorine in the test solutions was recovered. The results were similar when sodium chloride instead of sodium sulfate was the source of sodium.

| Precipitation | | | | Cryolite | | | | | | | |
|---|---|---|---|---|---|---|---|---|---|---|---|
| Weight ratio, F:P₂O₅ | Reagents, percent ᵃ | | pH ᵇ | Composition, percent | | | | Recovery, percent | | | |
| | Na | Al | | P₂O₅ | F | Al | Na | F | Al | Na |
| 40:1 | 120 | 95 | 5.8 | 0.12± | ----- | ----- | ----- | ----- | ----- | ----- |
| | 110 | 95 | 5.8 | 0.03 | 51.5 | ----- | ----- | 86 | ----- | ----- |
| | 100 | 98 | 5.8 | 0.05 | 53.0 | 12.2 | 30.2 | 91 | 90 | 86 |
| | 100 | 95 | 5.8 | 0.03 | 53.1 | 13.3 | 30.4 | 85 | 95 | 81 |
| | 100 | 100 | 5.8 | 0.06 | 52.7 | ----- | ----- | 92 | ----- | ----- |
| | 95 | 95 | 5.8 | 0.07 | 52.2 | 13.2 | 30.4 | 87 | 98 | 88 |
| | 95 | 95 | 5.2 | 0.06 | 52.4 | 13.2 | 29.3 | 87 | 98 | 85 |
| | 100 | 100 | 5.0 | 0.03 | 53.1 | ----- | ----- | 91 | ----- | ----- |
| | 95 | 95 | 4.0 | 0.04 | 52.5 | 12.5 | 28.8 | 87 | 92 | 83 |
| 30:1 | 95 | 95 | 5.0 | 0.05 | ----- | ----- | ----- | ----- | ----- | ----- |
| 15:1 | 95 | 95 | 6.0 | 0.12± | ----- | ----- | ----- | ----- | ----- | ----- |
| | 95 | 95 | 4.5 | 0.03 | ----- | ----- | ----- | ----- | ----- | ----- |
| 10:1 | 95 | 95 | 5.5 | 0.15± | ----- | ----- | ----- | ----- | ----- | ----- |
| | 95 | 95 | 5.0 | 0.08 | 53.0 | 13.3 | 28.3 | 85 | 95 | 80 |
| | 95 | 95 | 6.2 | 0.34± | ----- | ----- | ----- | ----- | ----- | ----- |
| | 95 | 95 | 5.5 | 0.19± | ----- | ----- | ----- | ----- | ----- | ----- |
| | 95 | 95 | 5.0 | 0.16± | ----- | ----- | ----- | ----- | ----- | ----- |
| 5:1 | 98 | 95 | 4.5 | 0.09 | 53.2 | 13.2 | 28.5 | 90 | 96 | 81 |
| | 95 | 95 | 4.5 | 0.08 | 52.6 | ----- | ----- | 85 | ----- | ----- |
| | 95 | 95 | 4.0 | 0.05 | 52.9 | 13.1 | 30.1 | 80 | 92 | 79 |

ᵃ Basis, stoichiometric requirement in Equation 1.
ᵇ Measured with "Accutint" indicator paper (Anachemta Chemicals Ltd., Montreal, Canada).

The sodium cryolite precipitates contained less than 0.6 percent SiO₂, less than 0.25 percent Fe₂O₃, and less than 5 percent SO₃. The results designated by the symbol ± show the preparation of unsatisfactory precipitates. These results are included to illustrate the sensitivity to degree of acidity characterizing this step. Each of these unsatisfactory precipitates was obtained by operating at a pH too high for a particular F:P₂O₅ weight ratio with the proportions of aluminum and sodium introduced.

EXAMPLE II

A solution of ammonium and sodium fluorides was prepared from the recycled spray water used to condense phosphorus in the effluent gas from an electric smelting furnace. This spray water was maintained at about pH 5.0 to 6.0 by addition of ammonia.

A 5-gallon lot of the recycle liquor obtained from the phosphorus-condenser system was stored in a polyethylene carboy. The suspended solids (dust, phosphorus particles, etc.) were allowed to settle at room temperature. The supernatant liquor contained, in grams per liter: F, 83.7; P₂O₅, 45.9; NH₃, 45.8; and SiO₂, 42.3. In a series of bench-scale tests, the fluorine was precipitated as sodium fluosilicate by adding sodium chloride to the condenser liquor

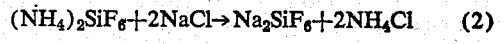

$$(NH_4)_2SiF_6 + 2NaCl \rightarrow Na_2SiF_6 + 2NH_4Cl \quad (2)$$

Of the fluorine initially present in the test solutions, 93 to 97 percent was precipitated when 125 to 200 percent of the theoretical amount of sodium chloride was used. The P₂O₅ content of the precipitates was about 0.1 percent. A batch of the sodium fluosilicate (F, 60.1; Na, 24.0; SiO₂, 31.5; P₂O₅, 0.1 percent) was decomposed, and silica precipitated with aqueous ammonia (150 percent of theory)

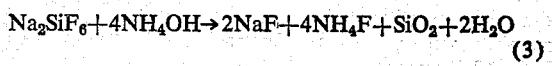

$$Na_2SiF_6 + 4NH_4OH \rightarrow 2NaF + 4NH_4F + SiO_2 + 2H_2O \quad (3)$$

The resulting solution of sodium fluoride and ammonium fluoride contained, in grams per liter: F, 27.8; Na, 11.1; P₂O₅, 0.05; and SiO₂, 0.17. The fluorine in the filtrate represented 92.7 percent of that in the fluosilicate used. This solution was used to make specification-grade cryolite by the acid process.

EXAMPLE III

The effluent gas from a calcium metaphosphate fertilizer furnace was scrubbed in small-scale tests with a water solution in which the pH was maintained at about 6 by adding ammonia. The F:P₂O₅ weight ratio of these scrubber solutions was about 6. Specification-grade cryolite was prepared from the liquors by the acid method when the pH of the precipitation mixture was 4, and when the aluminum and sodium added each was 95 percent of the stoichiometric requirement.

EXAMPLE IV

An integrated process for recovering fluorine as specification-grade cryolite from scrub liquors from several different sources and of different F:P₂O₅ weight ratios is outlined below. Filtered scrub liquors obtained by scrubbing waste gases from commercial-scale plants were used in this process. The scrub liquors used were obtained from phosphate rock nodulizing kilns, electric furnaces smelting phosphate rock, and a calcium metaphosphate fertilizer furnace.

The process given below was practiced on a bench scale only, and the quantities of fluorine and phosphorus pentoxide were calculated to full commercial scale. The quantities given are relative only and illustrated one possible combination of these materials. Specification-grade cryolite was prepared from the commercial scrub liquors, as indicated.

(1) *Nodulizing kiln liquor*

[1 ton F, 0.1 ton P₂O₅; F : P₂O₅=10]

Ammoniate liquor to pH of about 8.8, filter, wash, and discard solids; reserve filtrate (0.97 ton F, 0.09 ton P₂O₅) for step 4 below.

(2) *Metaphosphate furnace liquor*

[2 tons F, 0.25 ton P₂O₅; F : P₂O₅=8]

(a) Divide liquor into two parts and treat in 2(b) and 2(c).

(b) Treat one portion of 2(a) with a sodium salt such as sodium chloride to precipitate fluorine as NaF and Na₂SiF₆. Combine this precipitate (0.85 ton F, 0.005 ton P₂O₅) with precipitate from 3(a) and treat in 3(b).

(c) Ammoniate other portion of liquor from 2(a) to pH about 8.8, discard washed precipitate, and reserve solution (0.97 ton F, 0.18 ton P₂O₅) for step 4 below.

(3) *Phosphorus condenser liquor*

[1 ton F, 0.57 ton P₂O₅; F : P₂O₅=1.8]

(a) Treat liquor with a sodium salt such as sodium chloride to precipitate Na₂SiF₆. Filter and wash precipitate (0.93 ton F, 0.005 ton P₂O₅). Treat precipitate in 3(b).

(b) Combine precipitates from 2(b) and 3(a) and treat with aqueous ammonia to decompose fluosilicate and precipitate silica. Filter, wash, and discard precipitate; reserve filtrate (1.7 tons F, 0.01 ton P₂O₅) for step 4 below.

(4) *Combined Liquors 1(a), 2(c), and 3(b)*

[3.64 tons F, 0.28 ton P₂O₅; F : P₂O₅=13]

(a) Acidify combined liquors (as with H₂SO₄) to a pH of 5. Add soluble sodium and aluminum compounds corresponding to 95 percent of amounts required to form Na₃AlF₆ with all the fluorine (for other F:P₂O₅ ratios, different quantities of sodium and aluminum salts are required); filter, wash, and dry cryolite (5.8 tons Na₃AlF₆; P₂O₅<0.1 percent).

(b) Treat the filtrate from 4(a) with lime and heat to liberate ammonia, which is recycled in the process.

We claim as our invention:

1. A process for the manufacture of cryolite of specification grade which comprises preparing an impure aqueous solution of ammonium fluoride containing fluorine, phosphorus, silicon and iron compounds in such proportions that the weight ratio F:P₂O₅ is in the range from 5:1 to 400:1; the weight ratio F:SiO₂ is at least 15:1 and the weight ratio F:Fe₂O₃ is at least 100:1; adjusting the acidity of the solution so that its pH will be in the range from 4.0 to 6.0 after a later addition of sodium and aluminum salts; adding soluble sodium and aluminum salts to the solution in quantity sufficient to furnish from 95 to 100 percent of the proportions theoretically required to form Na₃AlF₆ with all fluorine present; adjusting the pH of the solution in dependent relationship to the weight ratio F:P₂O₅ in said solution for a minimum pH of about 4.0 at a weight ratio F:P₂O₅ of about 15:1 and below, and increasing the pH of said solution in proportion corresponding substantially to a proportional increase in the weight ratio F:P₂O₅ in said solution to a maximum of about pH 6.0 at a weight ratio F:P₂O₅ of about 40:1 and above; adjusting the quantity of said added sodium and aluminum salts in dependent relationship to the weight ratio F:P₂O₅ in said solution for a minimum of about 95 percent of said theoretical proportion at a weight ratio F:P₂O₅ of about 15:1 and below, and increasing the quantity of said added salts in proportion corresponding substantially to a proportional increase in the weight ratio F:P₂O₅ in said solution to a maximum of about 100 percent of said theoretical proportion at a weight ratio F:P₂O₅ of about 40:1 and above; washing and drying the resulting precipitated cryolite; and recovering said precipitate as product.

2. A process for the manufacture of cryolite of specification grade which comprises preparing an impure aqueous solution of ammonium fluoride containing congeneric substances derived from scrubbing waste gases emitted from processes in the phosphate industry including fluorine, phosphorus, silicon and iron compounds in such proportions that the weight ratio F:P₂O₅ is in the range from 5:1 to 400:1; the weight ratio F:SiO₂ is at least 15:1 and the weight ratio F:Fe₂O₃ is at least 100:1; acidifying the solution to such degree that its pH will be in the range from 4.0 to 6.0 after a later addition of sodium and aluminum salts; adding soluble sodium and aluminum salts to the solution in quantities sufficient to furnish 95 to 100 percent of the proportions theoretically required to form Na₃AlF₆ with all fluorine present; adjusting the pH of the solution in dependent relationship to the weight ratio F:P₂O₅ in said solution for a minimum pH of about 4.0 at a weight ratio F:P₂O₅ of not more than 15:1, and increasing the pH of said solution in proportion corresponding substantially to a proportional increase in the weight ratio F:P₂O₅ in said solution to a maximum of about pH 6.0 at a weight ratio F:P₂O₅ of not less than 40:1; adjusting the quantity of said added sodium and aluminum salts in dependent relationship to the weight ratio F:P₂O₅ in said solution for a minimum of about 95 percent of said theoretical proportion at a weight ratio F:P₂O₅ of not more than 15:1, and increasing the quantity of said added salts in proportion corresponding substantially to a proportional increase in the weight ratio F:P₂O₅ in said solution to a maximum of about 100 percent of said theoretical proportion at a weight ratio F:P₂O₅ of not less than 40:1; washing and drying the resulting precipitated cryolite; and recovering said precipitate as product.

3. A process for the manufacture of cryolite of specification grade which comprises preparing an impure aqueous solution of ammonium fluoride containing congeneric impurities derived by scrubbing gases emitted from a process in the phosphate industry with an ammonium fluoride solution maintained in the pH range from about 5.0 to 6.0 and containing fluorine, phosphorus, silicon and iron compounds in such proportions that the weight ratio F:P₂O₅ is in the range from 5 to 1 to 400 to 1; the weight ratio F:SiO₂ is at least 15:1 and the weight ratio F:Fe₂O₃ is at least 100:1; acidifying the solution to such degree that its pH will be in the range from 4.0 to 6.0 after a later addition of sodium and aluminum salts; adding soluble sodium and aluminum salts to this solution in quantities sufficient to furnish from 95 to 100 percent of the proportions theoretically required to form $Na_3AlF_6$ with all fluorine present; adjusting the pH of the solution in dependent relationship to the weight ratio $F:P_2O_5$ in said solution for a minimum pH in the range from about 4.0 to 5.0 at a weight ratio $F:P_2O_5$ of not more than 15:1, and increasing the pH of said solution in proportion corresponding substantially to a proportional increase in the weight ratio $F:P_2O_5$ in said solution to a maximum of about pH 6.0 at a weight ratio of $F:P_2O_5$ of not less than 40:1; adjusting the quantity of said added sodium and aluminum salts in dependent relationship to the weight ratio $F:P_2O_5$ in said solution for a minimum of about 95 percent of said theoretical proportion at a weight ratio $F:P_2O_5$ of not more than 15:1, and increasing the quantity of said added salts in proportion corresponding substantially to a proportional increase in the weight ratio $F:P_2O_5$ in said solution to a maximum of about 100 percent of said theoretical proportion at a weight ratio $F:P_2O_5$ of not less than 40:1; washing and drying the resulting precipitated cryolite; and recovering said precipitate as product.

References Cited in the file of this patent

UNITED STATES PATENTS

| | | |
|---|---|---|
| 1,475,155 | Howard | Nov. 20, 1923 |
| 1,475,156 | Howard | Nov. 20, 1923 |
| 1,642,896 | Sander | Sept. 20, 1927 |
| 2,573,282 | Sciacca | Oct. 30, 1951 |
| 2,687,341 | Mockrin | Aug. 24, 1954 |
| 2,728,634 | Miller | Dec. 27, 1955 |
| 2,780,524 | Gloss et al. | Feb. 5, 1957 |
| 2,816,818 | Gross | Dec. 7, 1957 |
| 2,916,352 | Fitch et al. | Dec. 8, 1959 |

FOREIGN PATENTS

| | | |
|---|---|---|
| 621,067 | France | May 4, 1927 |

OTHER REFERENCES

Schober: German application, 1,010,504, printed June 19, 1957.